United States Patent
Xu et al.

(10) Patent No.: US 9,848,129 B2
(45) Date of Patent: Dec. 19, 2017

(54) SYSTEMS AND METHODS FOR REAL-TIME INTEGRATING INFORMATION INTO VIDEOS

(71) Applicant: Chengdu Sioeye Technology Co., Ltd., Chengdu (CN)

(72) Inventors: Jun-jie Xu, Chengdu (CN); Jian Ren, Chengdu (CN)

(73) Assignee: Chengdu Sioeye Technology Co., Ltd., Chengdu (CN)

( * ) Notice: Subject to any disclaimer, the term of this patent is extended or adjusted under 35 U.S.C. 154(b) by 0 days.

(21) Appl. No.: 15/202,166

(22) Filed: Jul. 5, 2016

(65) Prior Publication Data

US 2017/0013202 A1 Jan. 12, 2017

(30) Foreign Application Priority Data

Jul. 8, 2015 (CN) ...................... 2015 2 0485601 U
Jul. 8, 2015 (CN) ...................... 2015 2 0485602 U
Jul. 8, 2015 (CN) ...................... 2015 2 0485718 U
Jul. 8, 2015 (CN) ...................... 2015 2 0486006 U
Jul. 8, 2015 (CN) ...................... 2015 2 0486046 U

(51) Int. Cl.
*H04N 5/232* (2006.01)
*G01S 19/52* (2010.01)
*G01S 19/13* (2010.01)
*G01C 5/00* (2006.01)
*G01C 5/06* (2006.01)

(52) U.S. Cl.
CPC ........... *H04N 5/23293* (2013.01); *G01C 5/00* (2013.01); *G01C 5/06* (2013.01); *G01S 19/13* (2013.01); *G01S 19/52* (2013.01); *G06T 2207/30221* (2013.01); *G06T 2207/30241* (2013.01); *H04N 2201/3253* (2013.01)

(58) Field of Classification Search
CPC ...... H04N 5/23293; G06T 2207/30221; G06T 2207/30224; G06T 2207/30228; G06T 2207/30241; G02B 2027/0138
See application file for complete search history.

(56) References Cited

U.S. PATENT DOCUMENTS 9,167,164 B2 * 10/2015 Baek .................. G11B 27/3027
2016/0321822 A1 * 11/2016 Kimura .............. H04N 5/23219
2017/0195554 A1 * 7/2017 Shatz ................. H04N 5/23216

* cited by examiner

*Primary Examiner* — Paul Berardesca
(74) *Attorney, Agent, or Firm* — Perkins Coie LLP

(57) ABSTRACT

The present disclosure is directed to a system that can incorporate information into captured images. The system includes a first encoder that can process image information captured from an image component and a second encoder that can process information collected from a sensor. The system further includes a synthesizer to combine the outputs from both the first encoder and the second encoder. The synthesizer can then generate an output and transmit it to a decoder, which decodes the generated output and then transmits the decoded output to a display. The display then visually presents the decoded output to a user. By this arrangement, the system enables a user to view information collected by the sensor and the captured image at the same time.

20 Claims, 12 Drawing Sheets

SYSTEMS AND METHODS FOR REAL-TIME INTEGRATING INFORMATION INTO VIDEOS

CROSS-REFERENCE TO RELATED APPLICATIONS

This application claims the benefit of Chinese Patent Application No. 2015204856016, filed Jul. 8, 2015 and entitled "A RECORDING SYSTEM FOR REAL-TIME AND SYNCHRONOUSLY INTEGRATING AIR PRESSURE AND ALTITUDE INFORMATION INTO VIDEO," Chinese Patent Application No. 2015204856020, filed Jul. 8, 2015 and entitled "A RECORDING SYSTEM FOR REAL-TIME AND SYNCHRONOUSLY INTEGRATING COORDINATE INFORMATION INTO VIDEO," Chinese Patent Application No. 2015204860064, filed Jul. 8, 2015 and entitled "A RECORDING SYSTEM FOR REAL-TIME AND SYNCHRONOUSLY INTEGRATING AIR PRESSURE AND LOCATION INFORMATION INTO VIDEO," Chinese Patent Application No. 2015204860469, filed Jul. 8, 2015 and entitled "A RECORDING SYSTEM FOR REAL-TIME AND SYNCHRONOUSLY INTEGRATING SPEED INFORMATION INTO VIDEO," Chinese Patent Application No. 2015204857184, filed Jul. 8, 2015 and entitled "A VIDEO CAPTURE SYSTEM WITH TRACK MARKING," the contents of which are hereby incorporated by reference in their entireties.

BACKGROUND

In recent years, sports cameras become more and more popular, and consumers use these sports cameras in various occasions. Due to recent technical development in semiconductor manufacturing, it becomes possible to incorporate multiple sensors into sports cameras. For example, it is possible to incorporate barometers, global positioning system (GPS) sensors, gyroscopes, speed meter, etc. into sports cameras. However, there is still a need for effectively utilizing and displaying information collected by these sensors. For example, a traditional sports camera with a speed sensor may be able to record the speed of the sports camera, but a user cannot instantly access such information when the sports camera is in operation. Therefore, it is advantageous to have a system and method that can provide a user with real-time information measured by the sensors that are incorporated in a sports camera.

BRIEF DESCRIPTION OF THE DRAWINGS

Embodiments of the disclosed technology will be described and explained through the use of the accompanying drawings.

Figure 1:
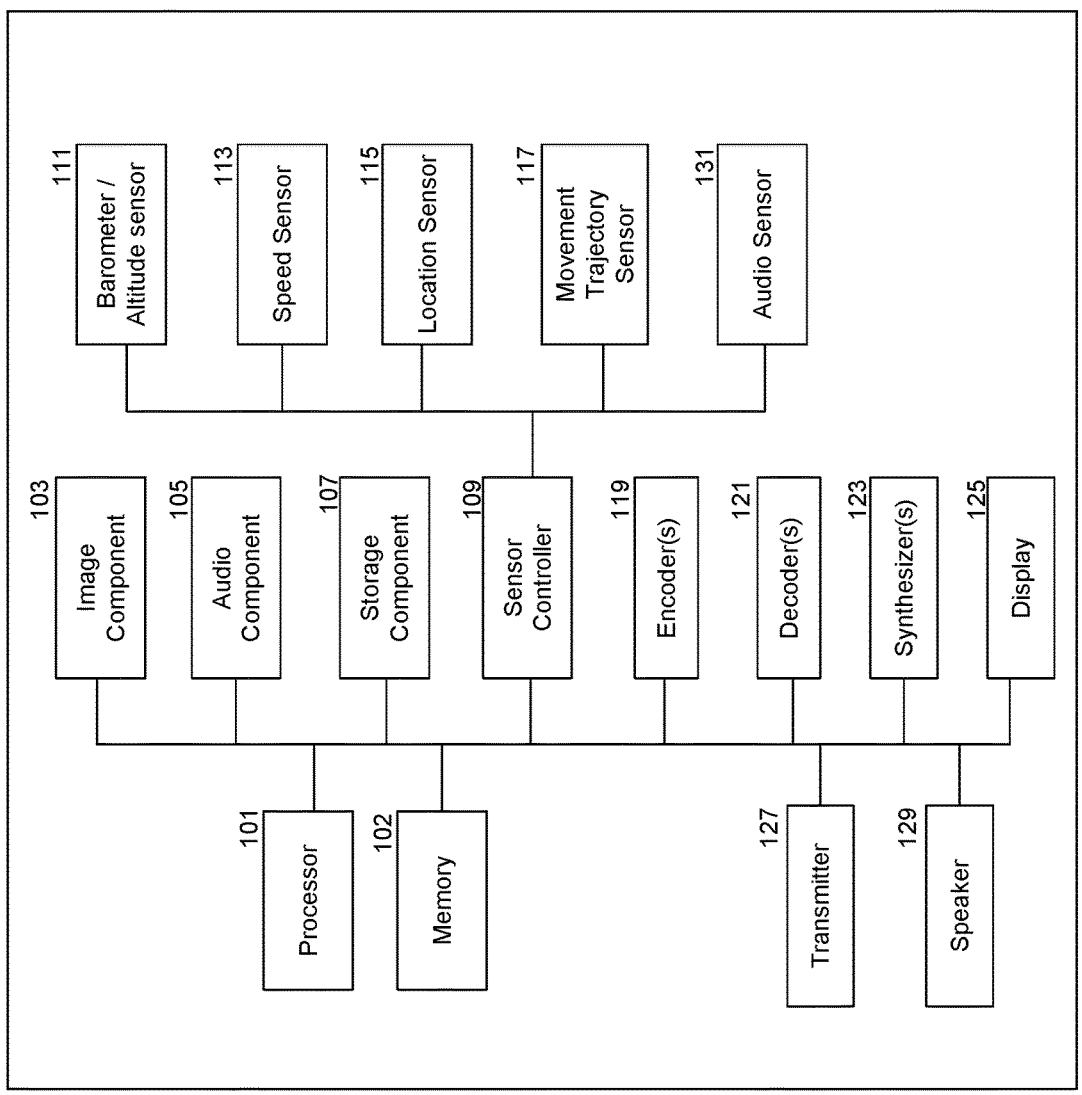
FIG. 1 is a schematic diagram illustrating embodiments of a system for incorporating real-time speed information into captured image files.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure is directed to a system that can incorporate information (e.g., location, latitude/longitude, barometric pressure/altitude, movement trajectory, speed or other suitable information) into captured images. The system includes a first encoder that can process image information captured from an image component and a second encoder that can process information collected from a sensor. The system further includes a synthesizer to combine the processed information from both the first encoder and the second encoder. The synthesizer can then generate an output and transmit it to a decoder, which decodes the generated output and then transmits the decoded output to a display.

The display then visually presents the decoded output to a user. By this arrangement, the system enables a user to view information collected by the sensor and the captured image at the same time. In some embodiments, the system enables a user to access a real-time video streaming with incorporated information collected by the sensor. For example, a user can use his/her mobile device to receive, from the system, a live streaming video of a skier skiing in a mountain, and the live streaming video includes incorporated information (such as speed/location/altitude/trajectory information) presented along with the video.

Advantages of the system includes that it provides users with information collected by the sensor in a real-time fashion. Also, the present system can provide the sensor-collected information along with the captured images without requiring additional user actions/quests. In other words, a user doesn't need to make an extra effort to request to access such information. It is also beneficial that the sensor-collected information is provided without interfering with a user's normal routine of receiving/viewing the captured images. In addition, providing the captured images with incorporated information may save a user a significant amount of time spending on processing or editing the captured images. As an example, a user doesn't need to manually add a note indicating a speed of a sports camera when editing the captured images. The system also provides a convenient way for a user to manage, edit, and/or analyze the captured images.

FIG. 1 is a schematic diagram illustrating embodiments of a system 100 for real-time incorporating speed information into captured image files. The system 100 includes a processor 101, a memory 102, an image component 103, an audio component 105, a storage component 107, a sensor controller 109, a barometer/altitude sensor 111, a speed sensor 113, a location sensor 115, a movement trajectory sensor 117, one or more encoders 119, one or more decoders 121, one or more synthesizers 123, a display 125, a transmitter 127, a speaker 129, and an audio sensor 131. The processor 101 is configured to control the memory 102 and other components (e.g., components 103-131) in the system 100. The memory 102 is coupled to the processor 101 and configured to store instructions for controlling other components in the system 100.

The image component 103 is configured to capture or collect images (pictures, videos, etc.) from ambient environments of the system 100. In some embodiments, the image component 103 can be a camera. In some embodiments, the image component 103 can be a video recorder. The audio component 105 is configured to capture or collect audio records/recordings from an audio source near the system 100. In some embodiments, the audio component 105 can be a microphone. In some embodiments, the audio component 105 can be a sound detector. The storage component 107 is configured to store, temporarily or permanently, information/data/files/signals associated with the system 100. In some embodiments, the storage component 107 can be a hard disk drive. In some embodiments, the storage component 107 can be a memory stick or a memory card.

In the illustrated embodiments shown in FIG. 1, the sensor controller 109 is coupled to the barometer/altitude sensor 111, the speed sensor 113, the location sensor 115, the movement trajectory sensor 117, and the audio sensor 131. In other embodiments, however, the types (e.g., different types of sensors can measure different types of parameters) and the numbers of the sensors can vary depending on design needs. The sensor controller 109 is configured to control and interface with the sensors in the system 100. In some embodiments, the sensor controller 109 can monitor the status of each sensor to make sure that they function normally. In some embodiments, the sensor controller 109 can (1) detect and/or identify the type of a sensor and (2) send commands to or receive feedbacks from the sensor accordingly. In some embodiments, the sensor controller 109 can be a sensor-hub chip.

The barometer/altitude sensor 111 is configured to generate a digital signal or an analog signal to indicate barometric pressure and altitude information (e.g., converted from the measured barometric pressure) of the environment where the system 100 locates. The speed sensor 113 is configured to measure a moving speed of the system 100. In some embodiments, the speed sensor 113 can be a micro controller unit (MCU) that can receive signals from a GPS locator. In some embodiments, the speed sensor 113 can be a system with a gyroscope and an accelerometer. In some embodiments, the speed may be calculated based on measured movements within a certain time period (e.g., from the information provided by the GPS locator). In other embodiments, the speed may be calculated based on information provided by the gyroscope and the accelerometer. The location sensor 115 is configured to measure a current location of the system 100. In some embodiments, the location sensor 115 can be a GPS sensor. In some embodiments, the location sensor 115 can be a BeiDou Navigation Satellite System (BDS) sensor. In some embodiments, the location sensor 115 can be a Global Navigation Satellite System (GLONASS) sensor. In some embodiments, the location sensor 115 can be a Galileo sensor. In some embodiments, the current location of the system 100 can be in a longitude/latitude format.

The movement trajectory sensor 117 is configured to measure a movement trajectory of the system 100 during a certain period of time (e.g., one hour, 10 minutes, or a period of time during which the image component 103 is in operation). The movement trajectory sensor 117 may comprise a sensor hub, a gyroscope sensor, an accelerometer and/or a GPS locator. The movement trajectory sensor generates a specific trajectory mark, when a condition referring to a predefined movement (e.g., stasis, starting, turning, and accelerating) is satisfied. In some embodiments, the movement trajectory can be calculated by the sensor hub based on an output from the GPS locator. In some embodiments, the movement trajectory can be calculated based on outputs from the gyroscope sensor and the accelerometer. In some embodiments, the movement trajectory sensor 117 can generate a set of movement marks respectively representing different types of movement. The generated movement output marks, along with time information, can be stored in a file with particular formats (e.g., as a text file). The audio sensor 131 is configured to measure sounds/voices near the system 100 and to generate an audio recording that can be audibly presented to a user by the speaker 129. In some embodiments, the audio sensor 131 can be a microphone. In some embodiments, the audio sensor 131 can be an apparatus that can receive analog or digital audio signals.

The encoders 119 are configured to receive various signals from the sensors in the system 100 and encode received signals into suitable formats that the synthesizers 123 can recognize and access. The synthesizers 123 are configured to receive encoded signals and combine them into container files (e.g., a container file can be a file with integrated signals and information). The synthesizers 123 can transmit these container files to the decoders 121. The decoders 121 then decode these container files into suitable formats that the display 125 can recognize and access. The display 125 can then visually present the decoded container files to a user of the system 100. In some embodiments, the decoded container files can be transmitted, e.g., by the transmitter 127, to a remote device (e.g., a server or a mobile device) via a network (e.g., a wireless network).

Figure 2:
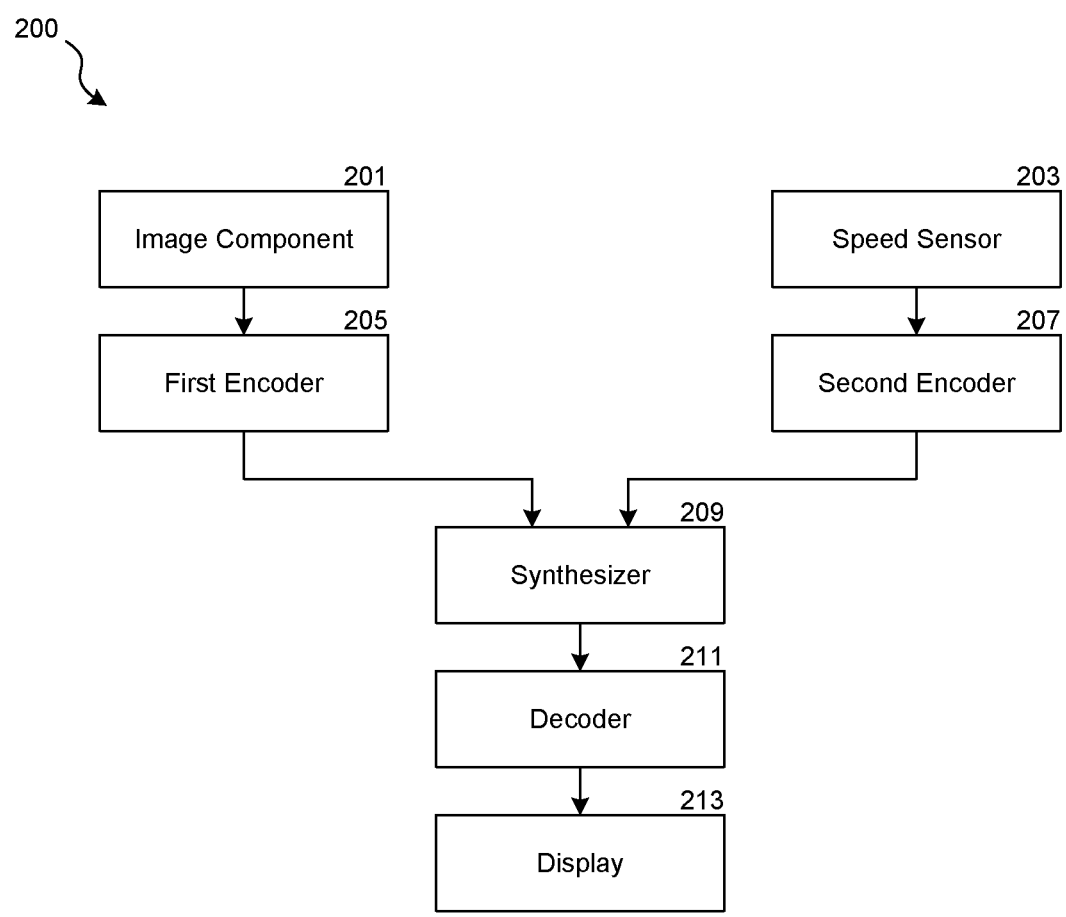
FIG. 2 is a schematic block diagram illustrating how a system in accordance with the present disclosure incorporates collected speed information into captured image files.

FIG. 2 is a schematic block diagram illustrating how a system 200 in accordance with the present disclosure incorporates collected speed information into captured image files. The system 200 includes an image component 201, a speed sensor 203, a first encoder 205, a second encoder 207, a synthesizer 209, a decoder 211, and a display 213. The image sensor 201 is coupled to the first encoder 205. The image sensor 201 is configured to transmit a captured image file to the first encoder 205. The first encoder 205 then encodes the captured image file into a format readable by the synthesizer 209. The speed sensor 203 is coupled to the second encoder 207. The speed sensor 203 is configured to transmit collected speed information of the system 200 to the second encoder 207. The second encoder 207 then encodes the speed information into a format readable by the synthesizer 209. After receiving the encoded image file from the first encoder 205 and the encoded speed information from the second encoder 207, the synthesizer 209 then combines the encoded image file and the encoded speed information and generates an image container file with incorporated speed information. The synthesizer 209 transmits the image container file to the decoder 211. The decoder 211 decodes the image container file to a format readable by the display 213. The display 213 then visually presents the decoded image container file to a user of the system 200.

Figure 3:
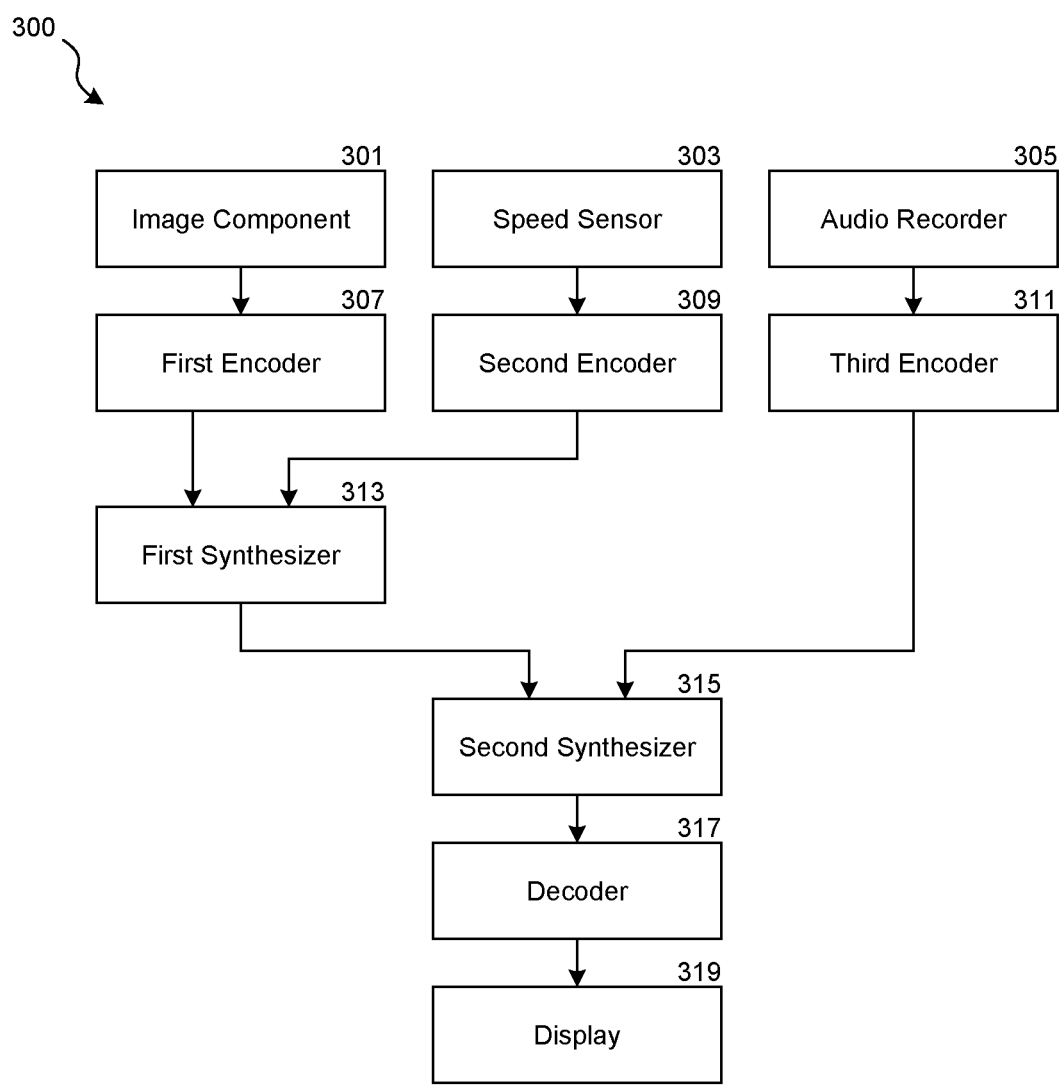
FIG. 3 is a schematic block diagram illustrating how a system in accordance with the present disclosure incorporates collected speed information and audio recordings into captured image files.

FIG. 3 is a schematic block diagram illustrating how a system 300 in accordance with the present disclosure incorporates collected speed information and audio recordings into captured image files. The system 300 includes an image component 301, a speed sensor 303, an audio recorder 305, a first encoder 307, a second encoder 309, a third encoder 311, a first synthesizer 313, a second synthesizer 315, a decoder 317, and a display 319. In some embodiment, the first synthesizer 313 and the second synthesizer 315 can be replaced by one single synthesizer that can integrate a captured image file, a collected audio recording, and collected speed information into one image container file at once. The image sensor 301 is coupled to the first encoder 307. The image sensor 301 is configured to transmit a captured image file to the first encoder 307. The first encoder 307 then encodes the captured image file into a format readable by the first synthesizer 313. The speed sensor 303 is coupled to the second encoder 309. The speed sensor 303 is configured to transmit collected speed information of the system 300 to the second encoder 309. In one embodiment, the speed information may be transmitted via a digital signal or an analogy signal. The second encoder 309 then encodes the speed information into a format readable by the first synthesizer 313. For example, the speed information may be written into a text file (e.g., a TXT file). After receiving the encoded image file from the first encoder 307 and the encoded speed information from the second encoder 309, the first synthesizer 313 then combines the encoded image file and the encoded speed information and generates an image container file with incorporated speed information. The first synthesizer 313 then transmits the image container file to the second synthesizer 315.

The audio recorder 305 is coupled to the third encoder 311. The audio recorder 305 is configured to transmit a collected audio recording to the third encoder 311. The third encoder 311 then encodes the audio recording into a format readable by the second synthesizer 315. In some embodiments, the file format can be MP3, AAC (Advance Audio Coding), or APE (aka "Monkey's Audio" format). The third encoder 311 then transmits the encoded audio recording to the second synthesizer 315. The second synthesizer 315 then combines the image container file and the encoded audio recording and generates an image container file that includes image, audio and speed information. The second synthesizer 315 then transmits the image container file to the decoder 317. The decoder 317 decodes the image container file to a format readable by the display 319. The display 319 then visually presents the decoded image container file to a user of the system 300.

Figure 4:
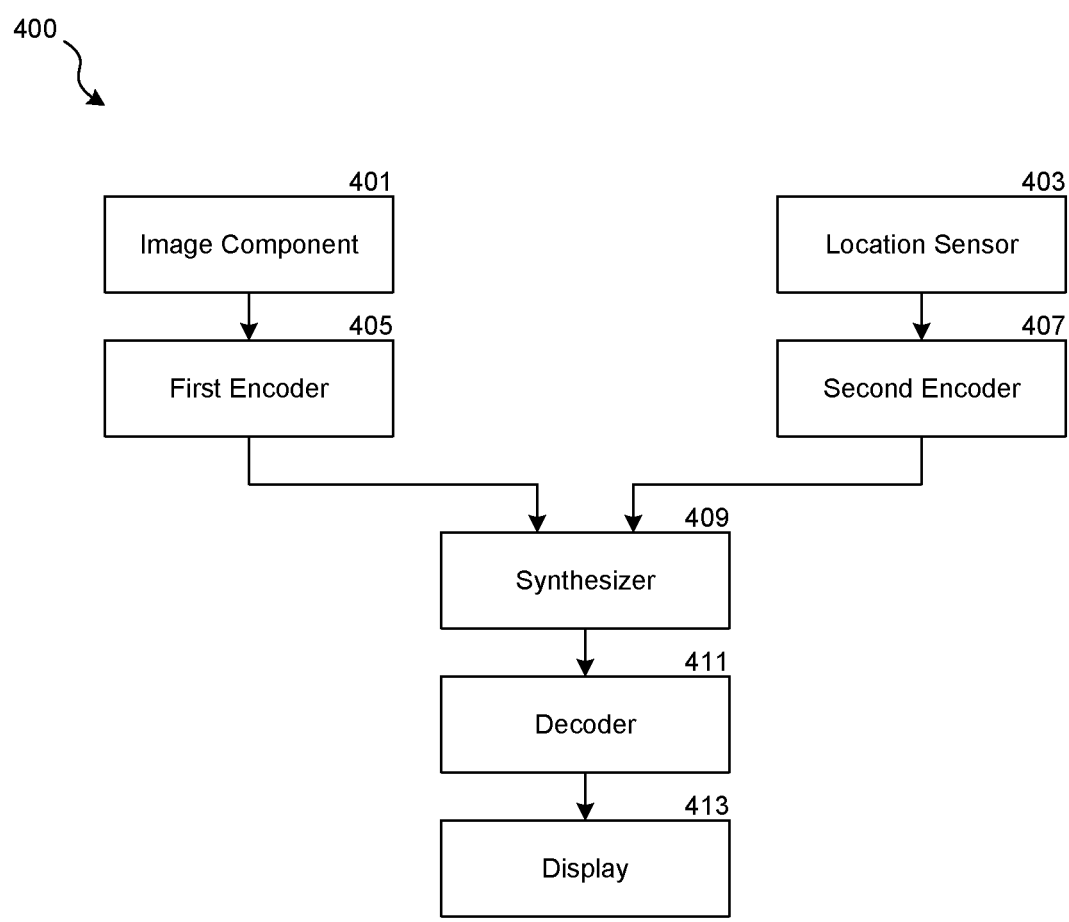
FIG. 4 is a schematic block diagram illustrating how a system in accordance with the present disclosure incorporates collected location information into captured image files.

FIG. 4 is a schematic block diagram illustrating how a system 400 in accordance with the present disclosure incorporates collected location information into captured image files. The system 400 includes an image component 401, a location sensor 403, a first encoder 405, a second encoder 407, a synthesizer 409, a decoder 411, and a display 413. The image sensor 401 is coupled to the first encoder 405. The image sensor 401 is configured to transmit a captured image file to the first encoder 405. The first encoder 405 then encodes the captured image file into a format readable by the synthesizer 409. The location sensor 403 is coupled to the second encoder 407. The location sensor 403 is configured to transmit collected location information of the system 400 to the second encoder 407. The second encoder 407 then encodes the location information into a format readable by the synthesizer 409. For example, the location information may be written into a text file (e.g., a TXT file). After receiving the encoded image file from the first encoder 405 and the encoded location information from the second encoder 407, the synthesizer 409 then combines the encoded image file and the encoded location information and generates an image container file with incorporated location information. The synthesizer 409 transmits the image container file to the decoder 411. The decoder 411 decodes the image container file to a format readable by the display 413. The display 413 then visually presents the decoded image container file to a user of the system 400.

Figure 5:
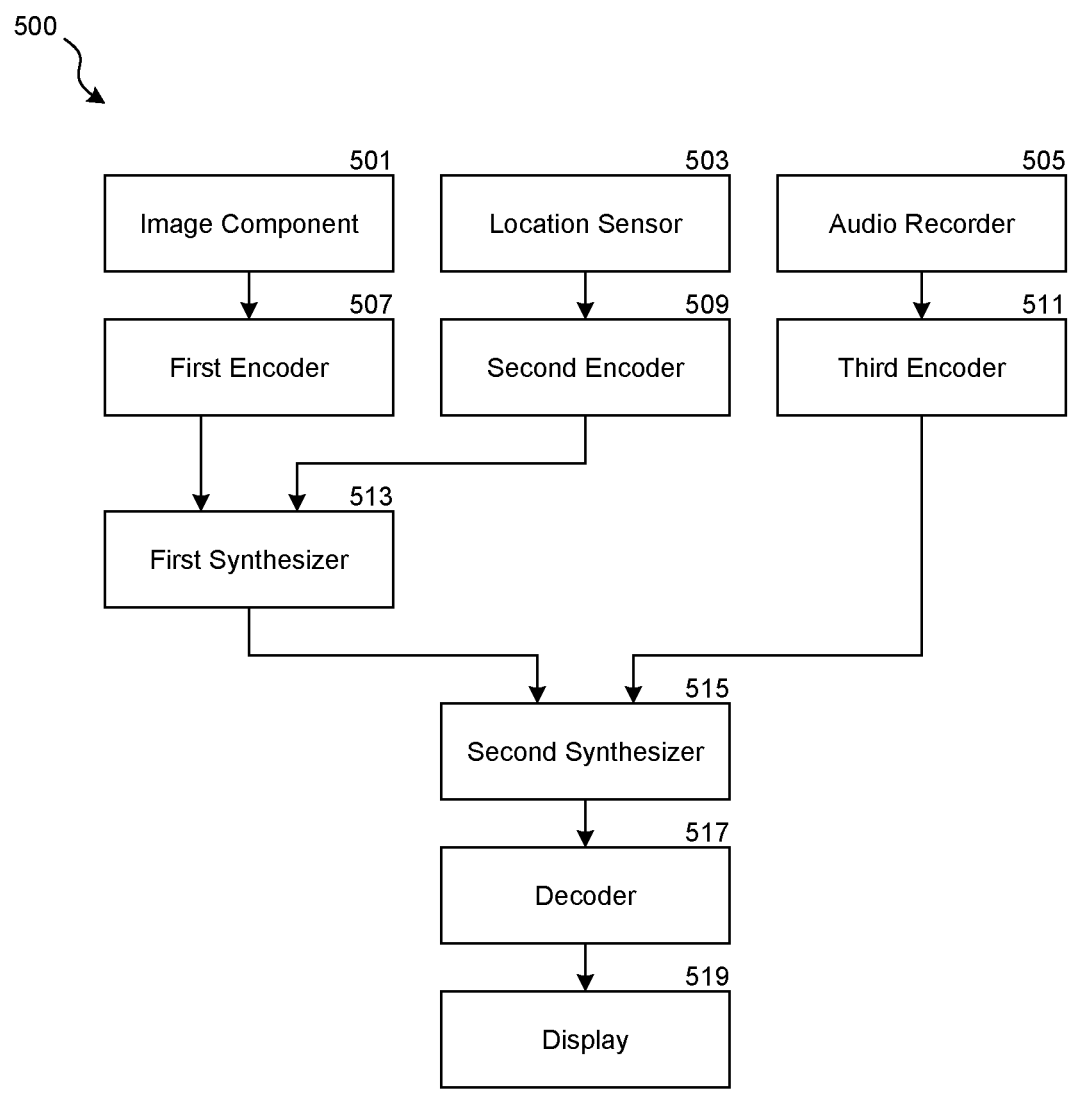
FIG. 5 is a schematic block diagram illustrating how a system in accordance with the present disclosure incorporates collected location information and audio recordings into captured image files.

FIG. 5 is a schematic block diagram illustrating how a system 500 in accordance with the present disclosure incorporates collected location information and audio recordings into captured image files. The system 500 includes an image component 501, a location sensor 503, an audio recorder 505, a first encoder 507, a second encoder 509, a third encoder 511, a first synthesizer 513, a second synthesizer 515, a decoder 517, and a display 519. In some embodiment, the first synthesizer 513 and the second synthesizer 515 can be replaced by one single synthesizer that can integrate a captured image file, a collected audio recording, and collected location information into one image container file at once. The image sensor 501 is coupled to the first encoder 507. The image sensor 501 is configured to transmit a captured image file to the first encoder 507. The first encoder 507 then encodes the captured image file into a format readable by the first synthesizer 513. The location sensor 503 is coupled to the second encoder 509. The location sensor 503 is configured to transmit collected location information of the system 500 to the second encoder 509. The second encoder 509 then encodes the location information into a format readable by the first synthesizer 513. After receiving the encoded image file from the first encoder 507 and the encoded location information from the second encoder 509, the first synthesizer 513 then combines the encoded image file and the encoded location information and generates an image container file with incorporated location information. The first synthesizer 513 then transmits the image container file to the second synthesizer 515.

The audio recorder 505 is coupled to the third encoder 511. The audio recorder 505 is configured to transmit a collected audio recording to the third encoder 511. The third encoder 511 then encodes the audio recording into a format readable by the second synthesizer 515. The third encoder 511 then transmits the encoded audio recording to the second synthesizer 515. The second synthesizer 515 then combines the image container file and the encoded audio recording and generates an image container file that includes image, audio and location information. The second synthesizer 515 then transmits the image container file to the decoder 517. The decoder 517 decodes the image container file to a format readable by the display 519. The display 519 then visually presents the decoded image container file to a user of the system 500.

Figure 6:
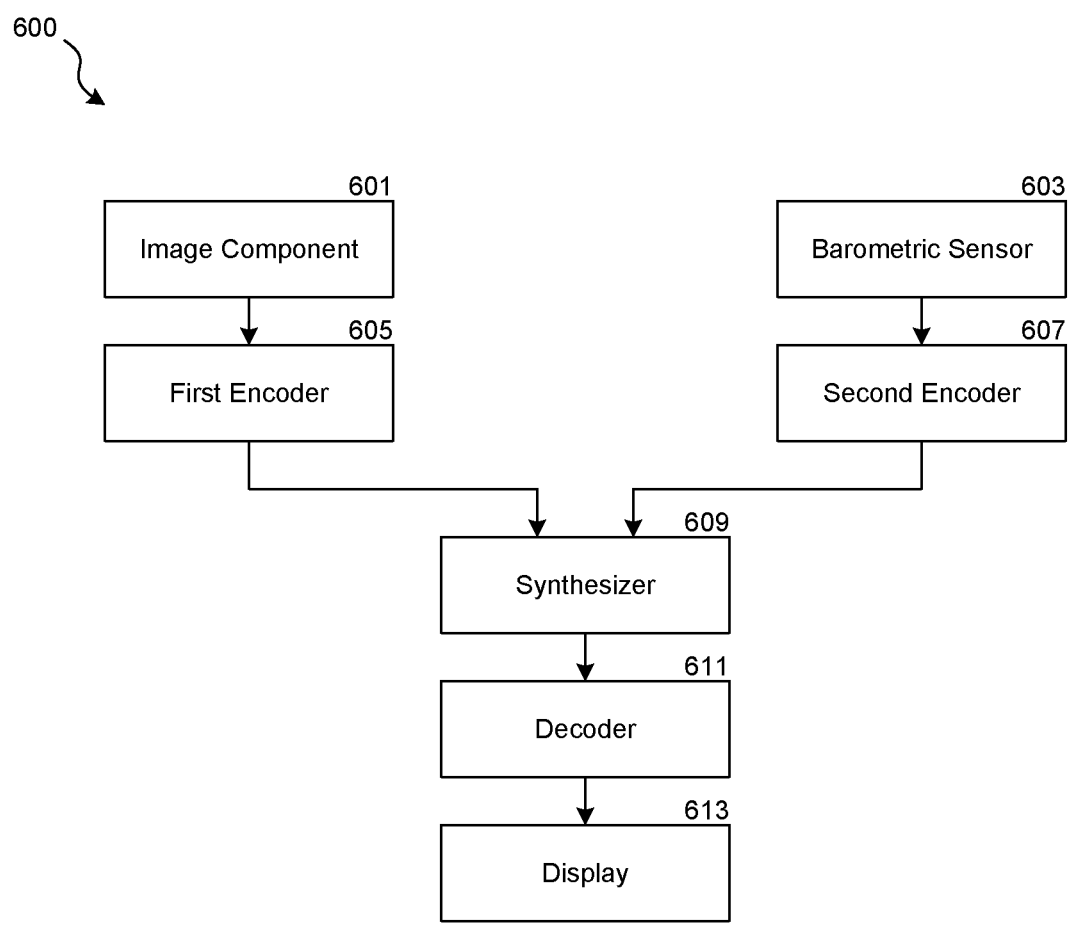
FIG. 6 is a schematic block diagram illustrating how a system in accordance with the present disclosure incorporates collected barometric information into captured image files.

FIG. 6 is a schematic block diagram illustrating how a system 600 in accordance with the present disclosure incorporates collected barometric information into captured image files. The system 600 includes an image component 601, a barometric sensor 603, a first encoder 605, a second encoder 607, a synthesizer 609, a decoder 611, and a display 613. The image sensor 601 is coupled to the first encoder 605. The image sensor 601 is configured to transmit a captured image file to the first encoder 605. The first encoder 605 then encodes the captured image file into a format readable by the synthesizer 609. The barometric sensor 603 is coupled to the second encoder 607. The barometric sensor 603 is configured to transmit collected barometric information of the system 600 to the second encoder 607. The second encoder 607 then encodes the barometric information into a format readable by the synthesizer 609. After receiving the encoded information from the first and second encoders 605 and 607, the synthesizer 609 then combines the encoded image file and the encoded barometric information and generates an image container file with incorporated barometric information. The synthesizer 609 transmits the image container file to the decoder 611. The decoder 611 decodes the image container file to a format readable by the display 613. The display 613 then visually presents the decoded image container file to a user of the system 600.

Figure 7:
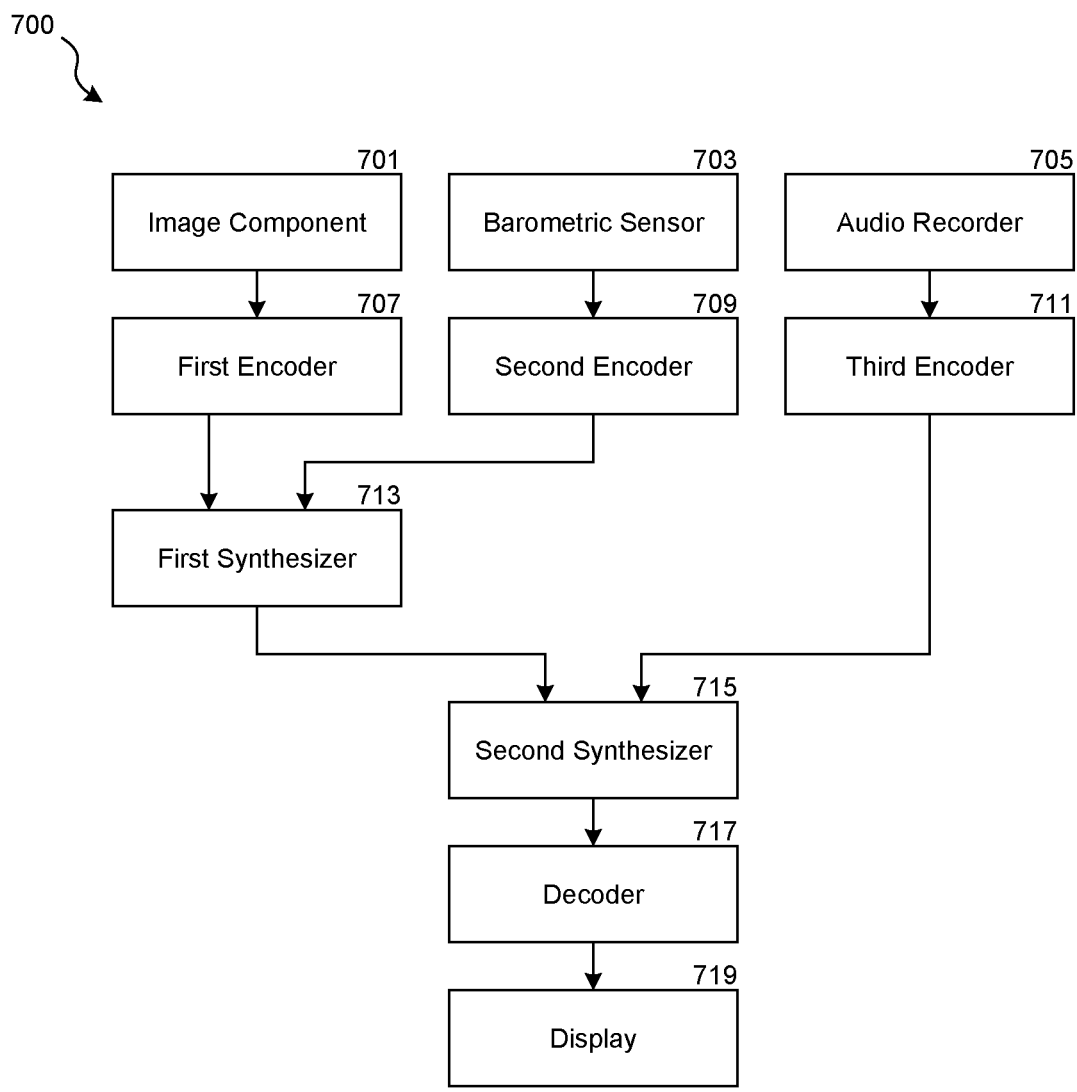
FIG. 7 is a schematic block diagram illustrating how a system in accordance with the present disclosure incorporates collected barometric information and audio recordings into captured image files.

FIG. 7 is a schematic block diagram illustrating how a system 700 in accordance with the present disclosure incorporates collected barometric information and audio recordings into captured image files. The system 700 includes an image component 701, a barometric sensor 703, an audio recorder 705, a first encoder 707, a second encoder 709, a third encoder 711, a first synthesizer 713, a second synthesizer 715, a decoder 717, and a display 719. In some embodiment, the first synthesizer 713 and the second synthesizer 715 can be replaced by one single synthesizer that can integrate a captured image file, a collected audio recording, and collected barometric information into one image container file at once. The image sensor 701 is coupled to the first encoder 707. The image sensor 701 is configured to transmit a captured image file to the first encoder 707. The first encoder 707 then encodes the captured image file into a format readable by the first synthesizer 713. The barometric sensor 703 is coupled to the second encoder 709. The barometric sensor 703 is configured to transmit collected barometric information of the system 700 to the second encoder 709. The second encoder 709 then encodes the barometric information into a format readable by the first synthesizer 713. After receiving the encoded information from the first and second encoders 707 and 709, the first synthesizer 713 then combines the encoded image file and the encoded barometric information and generates an image container file with incorporated barometric information. The first synthesizer 713 then transmits the image container file to the second synthesizer 715.

The audio recorder 705 is coupled to the third encoder 711. The audio recorder 705 is configured to transmit a collected audio recording to the third encoder 711. The third encoder 711 then encodes the audio recording into a format readable by the second synthesizer 715. The third encoder 711 then transmits the encoded audio recording to the second synthesizer 715. The second synthesizer 715 then combines the image container file and the encoded audio recording and generates an image container file that includes image, audio, and barometric information. The second synthesizer 715 then transmits the image container file to the decoder 717. The decoder 717 decodes the image container file to a format readable by the display 719. The display 719 then visually presents the decoded image container file to a user of the system 700.

Figure 8:
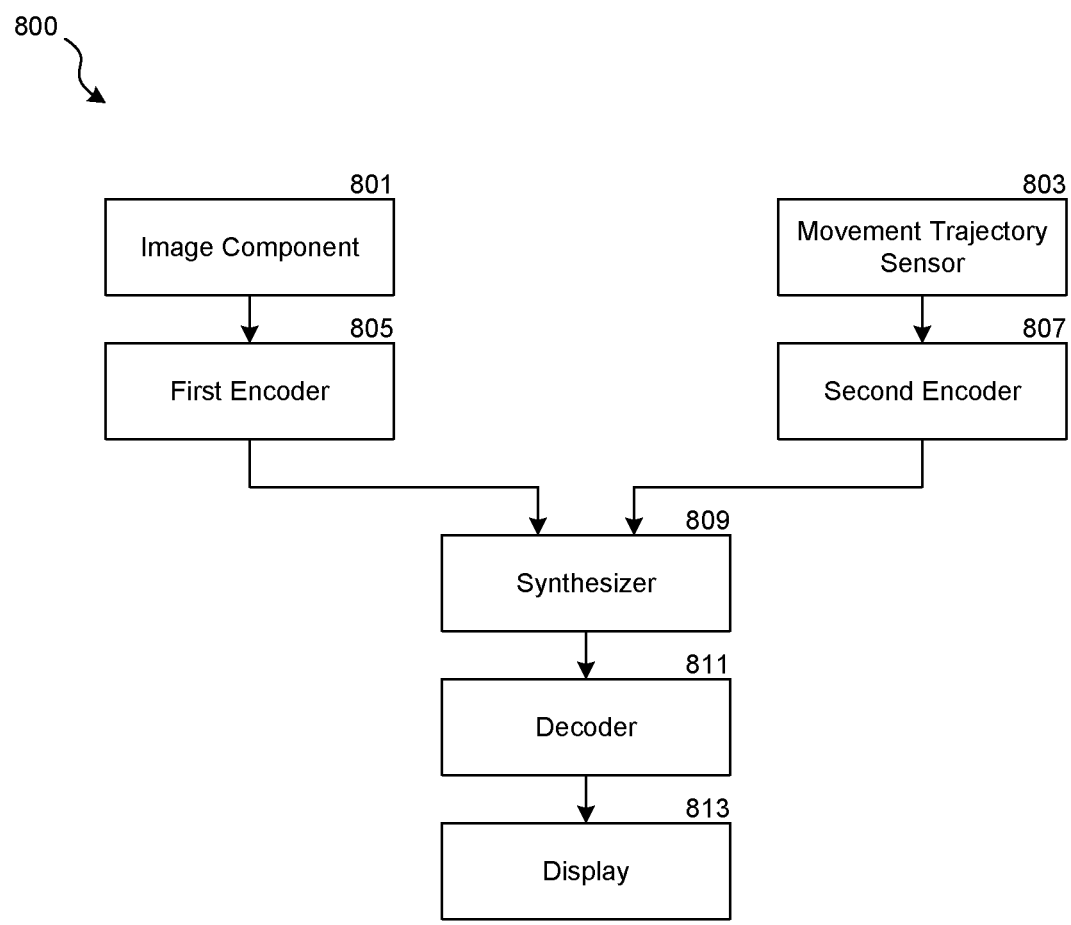
FIG. 8 is a schematic block diagram illustrating how a system in accordance with the present disclosure incorporates collected movement trajectory information into captured image files.

FIG. 8 is a schematic block diagram illustrating how a system 800 in accordance with the present disclosure incorporates collected movement trajectory information into captured image files. The system 800 includes an image component 801, a movement trajectory sensor 803, a first encoder 805, a second encoder 807, a synthesizer 809, a decoder 811, and a display 813. The image sensor 801 is coupled to the first encoder 805. The image sensor 801 is configured to transmit a captured image file to the first encoder 805. The first encoder 805 then encodes the captured image file into a format readable by the synthesizer 809. The movement trajectory sensor 803 is coupled to the second encoder 807. The movement trajectory sensor 803 is configured to transmit collected movement trajectory information of the system 800 to the second encoder 807. The second encoder 807 then encodes the movement trajectory information into a format readable by the synthesizer 809. After receiving the encoded information from the first and second encoders 805 and 807, the synthesizer 809 then combines the encoded image file and the encoded movement trajectory information and generates an image container file with incorporated movement trajectory information. The synthesizer 809 transmits the image container file to the decoder 811. The decoder 811 decodes the image container file to a format readable by the display 813. The display 813 then visually presents the decoded image container file to a user of the system 800.

Figure 9:
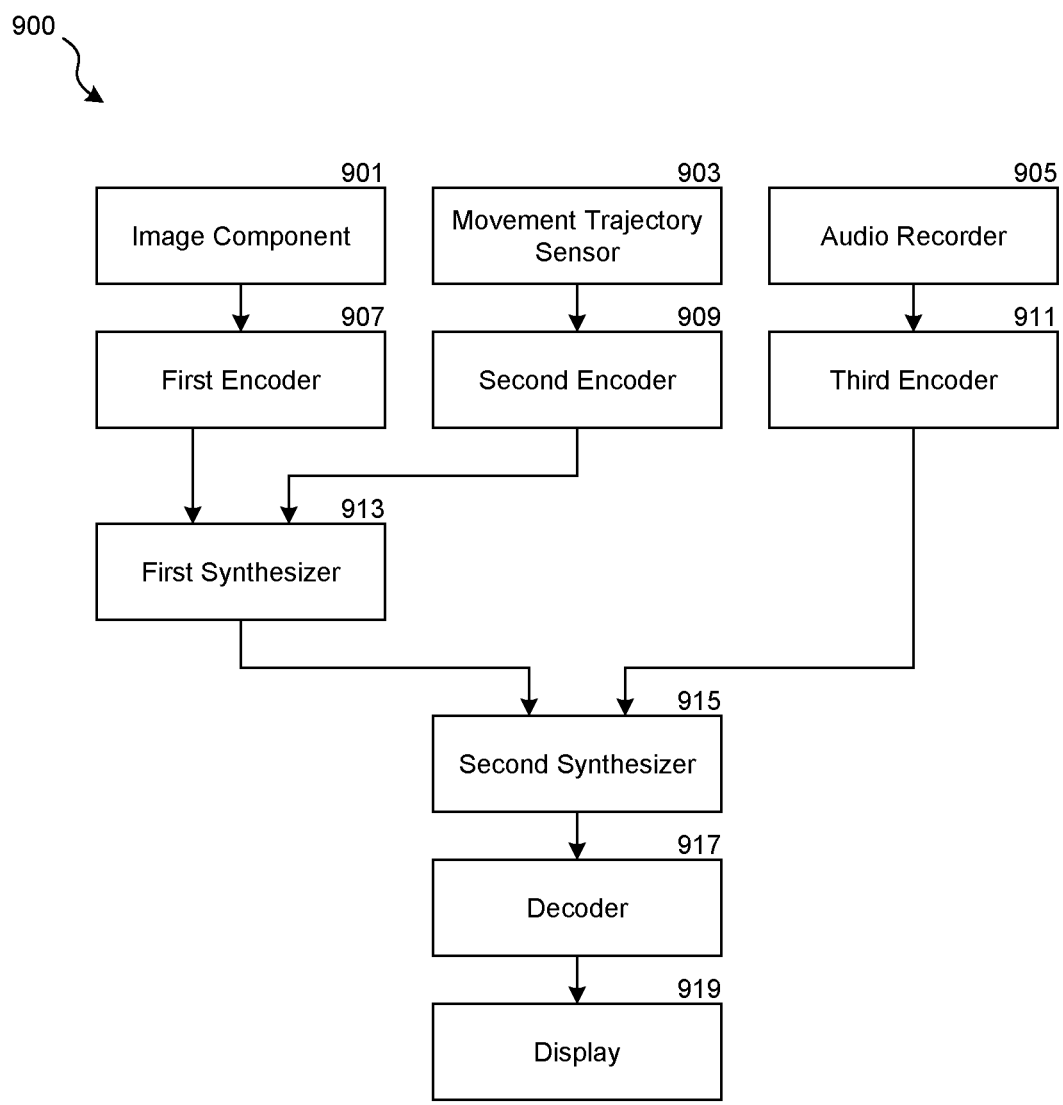
FIG. 9 is a schematic block diagram illustrating how a system in accordance with the present disclosure incorporates collected movement trajectory information and audio recordings into captured image files.

FIG. 9 is a schematic block diagram illustrating how a system 900 in accordance with the present disclosure incorporates collected movement trajectory information and audio recordings into captured image files. The system 900 includes an image component 901, a movement trajectory sensor 903, an audio recorder 905, a first encoder 907, a second encoder 909, a third encoder 911, a first synthesizer 913, a second synthesizer 915, a decoder 917, and a display 919. In some embodiment, the first synthesizer 913 and the second synthesizer 915 can be replaced by one single synthesizer that can integrate a captured image file, a collected audio recording, and collected movement trajectory information into one image container file at once. The image sensor 901 is coupled to the first encoder 907. The image sensor 901 is configured to transmit a captured image file to the first encoder 907. The first encoder 907 then encodes the captured image file into a format readable by the first synthesizer 913. The movement trajectory sensor 903 is coupled to the second encoder 909. The movement trajectory sensor 903 is configured to transmit collected movement trajectory information of the system 900 to the second encoder 909. The second encoder 909 then encodes the movement trajectory information into a format readable by the first synthesizer 913. After receiving the encoded information from the first and second encoders 907 and 909, the first synthesizer 913 then combines the encoded image file and the encoded movement trajectory information and generates an image container file with incorporated movement trajectory information. The first synthesizer 913 then transmits the image container file to the second synthesizer 915.

The audio recorder 905 is coupled to the third encoder 911. The audio recorder 905 is configured to transmit a collected audio recording to the third encoder 911. The third encoder 911 then encodes the audio recording into a format readable by the second synthesizer 915. The third encoder 911 then transmits the encoded audio recording to the second synthesizer 915. The second synthesizer 915 then combines the image container file and the encoded audio recording and generates an image container file with incorporated movement trajectory information. The second synthesizer 915 then transmits the image container file to the decoder 917. The decoder 917 decodes the image container file to a format readable by the display 919. The display 919 then visually presents the decoded image container file to a user of the system 900.

Figure 10:
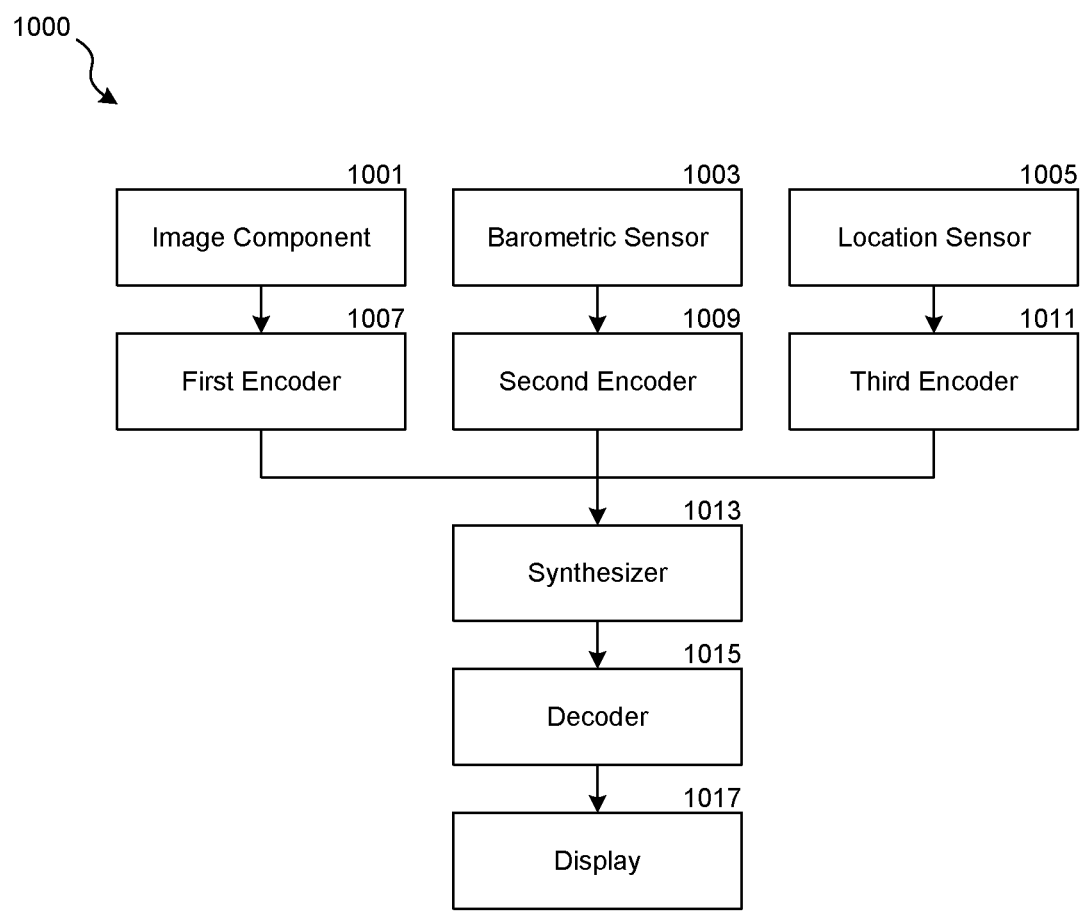
FIG. 10 is a schematic block diagram illustrating how a system in accordance with the present disclosure incorporates collected barometric information and location information into captured image files.

FIG. 10 is a schematic block diagram illustrating how a system 1000 in accordance with the present disclosure incorporates collected barometric information and location information into captured image files. The system 1000 includes an image component 1001, a barometric sensor 1003, a location sensor 1005, a first encoder 1007, a second encoder 1009, a third encoder 1011, a synthesizer 1013, a decoder 1015, and a display 1017. The image sensor 1001 is coupled to the first encoder 1007. The image sensor 1001 is configured to transmit a captured image file to the first encoder 1007. The first encoder 1007 then encodes the captured image file into a format readable by the synthesizer 1013. The barometric sensor 1003 is coupled to the second encoder 1009. The barometric sensor 1003 is configured to transmit collected barometric information of the system 1000 to the second encoder 1009. The second encoder 1009 then encodes the barometric information into a format readable by the synthesizer 1013. The location sensor 1005 is coupled to the third encoder 1011. The location sensor 1005 is configured to transmit collected location information of the system 1000 to the third encoder 1011. The third encoder 1011 then encodes the location information into a format readable by the synthesizer 1013.

After receiving the encoded information from the first, second, and third encoders 1007, 1009, and 1011, the synthesizer 1013 combines the encoded image file, the encoded barometric information, and the encoded location information. The synthesizer 1013 then generates an image container file with incorporated barometric/location information. The synthesizer 1013 transmits the image container file to the decoder 1015. The decoder 1015 decodes the image container file to a format readable by the display 1017. The display 1017 then visually presents the decoded image container file to a user of the system 1000.

Figure 11:
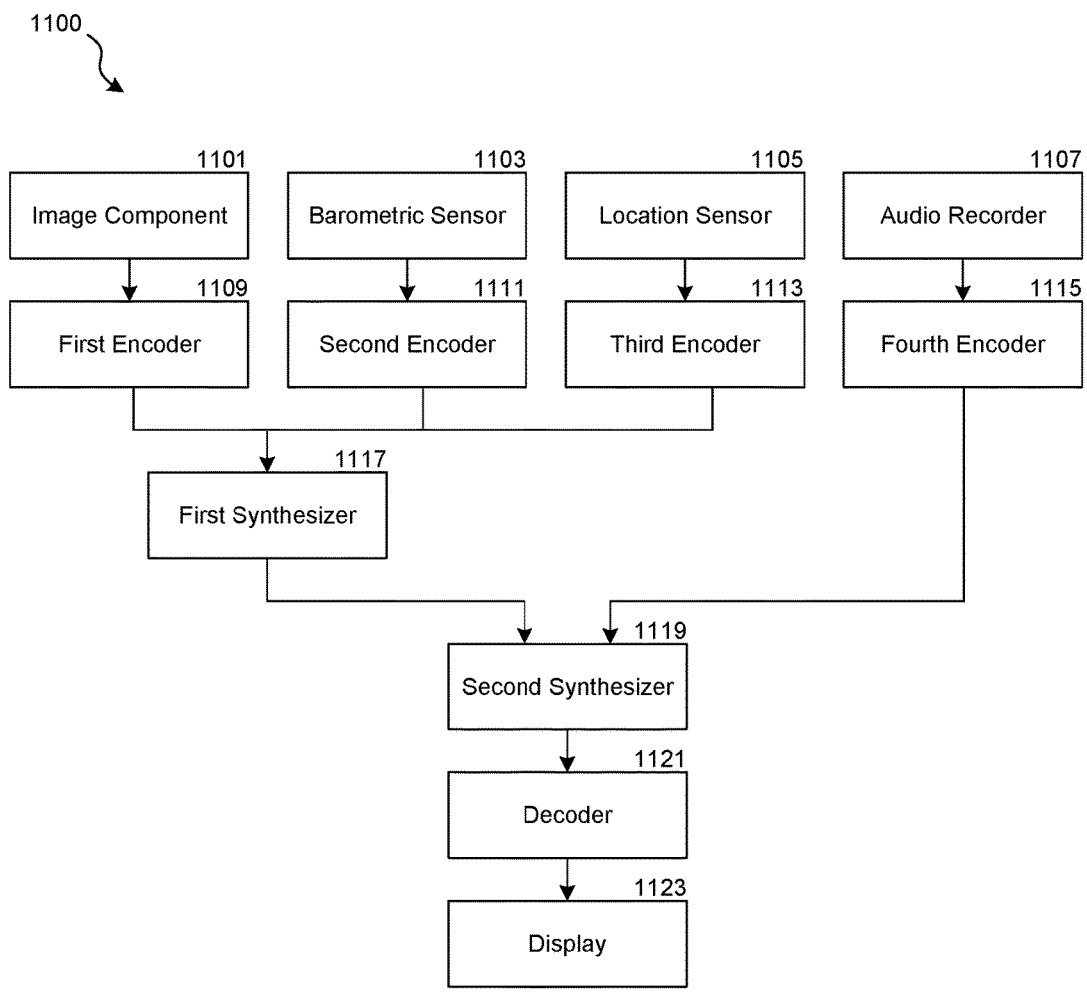
FIG. 11 is a schematic block diagram illustrating how a system in accordance with the present disclosure incorporates collected barometric and location information and audio recordings into captured image files.

FIG. 11 is a schematic block diagram illustrating how a system 1100 in accordance with the present disclosure incorporates collected barometric and location information and audio recordings into captured image files. The system 1100 includes an image component 1101, a barometric sensor 1103, a location sensor 1105, an audio recorder 1107, a first encoder 1109, a second encoder 1111, a third encoder 1113, a fourth encoder 1115, a first synthesizer 1117, a second synthesizer 1119, a decoder 1121, and a display 1123.

In some embodiment, the first synthesizer 1117 and the second synthesizer 1119 can be replaced by one single synthesizer that can integrate a captured image file, a collected audio recording, and collected barometric and location information into one image container file at once. The image sensor 1101 is coupled to the first encoder 1109. The image sensor 1101 is configured to transmit a captured image file to the first encoder 1109. The first encoder 1109 then encodes the captured image file into a format readable by the first synthesizer 1117. The barometric sensor 1103 is coupled to the second encoder 1111. The barometric sensor 1103 is configured to transmit collected barometric information of the system 1100 to the second encoder 1111. The second encoder 1111 then encodes the barometric information into a format readable by the first synthesizer 1117. The location sensor 1105 is configured to transmit collected location information of the system 1100 to the third encoder 1113. The third encoder 1113 then encodes the location information into a format readable by the first synthesizer 1117. After receiving the encoded information from the first, second, and third encoders 1109, 1111, and 1113, the first synthesizer 1117 combines the encoded image file, the encoded barometric information, and the encoded location information. The first synthesizer 1117 then generates an image container file with incorporated barometric/location information. The first synthesizer 1117 then transmits the image container file to the second synthesizer 1119.

The audio recorder 1107 is coupled to the fourth encoder 1115. The audio recorder 1107 is configured to transmit a collected audio recording to the fourth encoder 1115. The fourth encoder 1115 then encodes the audio recording into a format readable by the second synthesizer 1119. The fourth encoder 1115 then transmits the encoded audio recording to the second synthesizer 1119. The second synthesizer 1119 then combines the image container file and the encoded audio recording to form an image container file with incorporated barometric/location information. The second synthesizer 1119 then transmits the image container file to the decoder 1121. The decoder 1121 decodes the image container file to a format readable by the display 1123. The display 1123 then visually presents the decoded image container file to a user of the system 1100.

Figure 12:
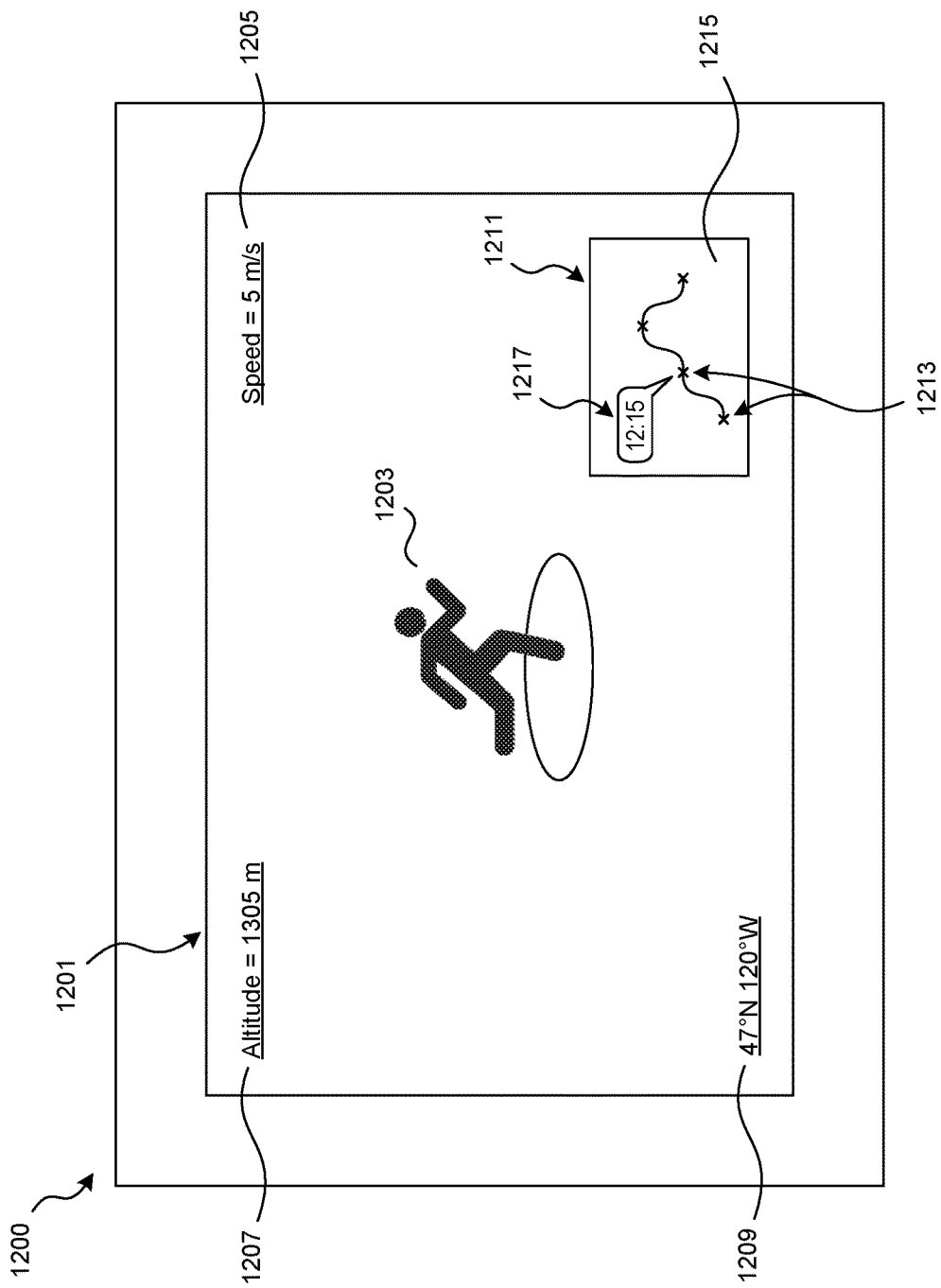
FIG. 12 is a schematic diagram illustrating a display having a user interface to visually present a real-time video generated by a system in accordance with the present disclosure.

FIG. 12 is a schematic diagram illustrating a display 1200 having a user interface 1201 to visually present a real-time video generated by a system in accordance with the present disclosure. In the illustrated embodiment, the real-time video generated by the system includes an object-of-interest 1203, altitude information 1207, speed information 1205, location information 1209, and movement trajectory information 1211. As shown, the object-of-interest 1203 is a skier positioned in the center of the user interface 1201. In some embodiments, the object-of-interest 1203 can be shown at other places of the user interface 1201. The altitude information 1207 is located at the upper-left corner of the user interface 1201. In some embodiments, the altitude information 1207 can be replaced by barometric pressure information. The speed information 1205 is located at the upper-right corner of the user interface 1201. In some embodiments, the speed information can be shown by symbols or icons (e.g., arrows; more arrows means higher speed). The location information 1209 is located at the lower-left corner of the user interface 1201. In the illustrated embodiment, the location information 1209 is in the format of latitude and longitude. In other embodiments, the location information 1209 can be presented in other formats (e.g., an icon in a map). The movement trajectory information 1211 is located at the lower-right corner of the user interface 1201.

In the illustrated embodiment, the movement trajectory information 1211 is presented with various marks 1213 on a small map 1215. In some embodiments, the marks 1213 can be annotated with corresponding time descriptions 1217.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A system for integrating information into images, comprising:
    a processor;
    an image component coupled to the processor and configured to generate an original image file;
    a sensor coupled to the processor and configured to measure a parameter associated with the system so as to generate a set of information;
    a first encoder coupled to the processor and configured to encode the original image file so as to generate an encoded image file;
    a second encoder coupled to the processor and configured to encode the set of information so as to generate an encoded information;
    a synthesizer coupled to the processor and configured to combine the encoded image file and the encoded information so as to generate an image container file;
    a decoder coupled to the processor and configured to form a decoded file at least based on the image container file; and
    a display coupled to the processor and configured to visually present the decoded file to a user, wherein the decoded file is visually presented via a user interface shown in the display, and wherein the user interface includes a first area configured to visually present the original image file and a second area configured to visually present the set of information.

2. The system of claim 1, further comprising:
    a sensor controller positioned between the processor and the sensor, wherein the sensor controller is configured to monitor a status of the sensor.

3. The system of claim 1, further comprising:
    an audio component coupled to the processor and configured to generate an audio recording; and
    a third encoder coupled to the processor and configured to encode the audio recording so as to generate an encoded audio recording.

4. The system of claim 3, wherein the synthesizer is a first synthesizer, and wherein the encoded audio recording is transmitted to a second synthesizer, and the second synthesizer combines the image container file and the encoded audio recording so as to generate an integrated image-audio file.

5. The system of claim 4, wherein the decoder decodes the integrated image-audio file to form the decoded file.

6. The system of claim 5, further comprising a speaker coupled to the processor, wherein the speaker audibly presents the decoded file to the user.

7. The system of claim 1, further comprising:
    a transmitter coupled to the processor and configured to transmit the decoded image file to a remote device via a wireless connection.

8. The system of claim 1, further comprising:
    a storage component coupled to the processor and configured to store the decoded file.

9. The system of claim 1, wherein the parameter is a speed.

10. The system of claim 1, wherein the parameter is barometric pressure.

11. The system of claim 1, wherein the parameter is an altitude.

12. The system of claim 1, wherein the parameter is a location.

13. The system of claim 1, wherein the parameter is a movement trajectory.

14. A method for integrating information into images, comprising:
    generating, by an image component, an original image file;
    encoding the original image file so as to generate an encoded image file;
    measuring, by a sensor, a parameter so as to generate a set of information;
    encoding the set of information so as to generate an encoded information;
    synthesizing the encoded image file and the encoded information so as to generate an image container file;
    forming a decoded file at least based on processing the image container file; and
    visually present the decoded file to a user via a user interface, wherein the user interface includes a first area configured to visually present the original image file and a second area configured to visually present the set of information.

15. The method of claim 14, further comprising:
    controlling the sensor by a sensor controller; and
    monitoring a status of the sensor by the sensor controller.

16. The method of claim 14, further comprising:
    generating an audio recording by an audio component;
    encoding the audio recording so as to generate an encoded audio recording; and
    forming the decoded file based on processing the encoded audio recording.

17. The method of claim 16, further comprising audibly presenting the decoded file to the user.

18. A method for presenting an integrated real-time video to a user, the method comprising:
    encoding a real-time video captured from a sports camera;
    encoding a set of information generated based on a measurement of a parameter performed by a sensor coupled to the sports camera;
    combining the real time video and the set of information to form an output;
    decoding the output to form a decoded file;
    initiating a user interface in a display; and
    visually presenting the decoded file in the user interface, wherein the user interface includes a first area and a second area, and wherein a real-time-video part of the decoded file is visually presented in the first area, and wherein the information part of the decoded file is visually presented in the second area.

19. The method of claim 18, wherein the first area and the second area are overlapped.

20. The method of claim 19, wherein the first area is a background of the user interface, and wherein the second area is a portion of the background.

* * * * *